US009929821B2

(12) United States Patent
Nishikori et al.

(10) Patent No.: US 9,929,821 B2
(45) Date of Patent: Mar. 27, 2018

(54) MIXING CONSOLE (71) Applicant: Yamaha Corporation, Hamamatsu-shi, Shizuoka-ken (JP)

(72) Inventors: Taku Nishikori, Hamamatsu (JP); Takumi Tanaka, Hamamatsu (JP); Chris Angell, Rellingen (DE); Chris Taylor, Buena Park, CA (US); Hiroaki Fujita, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 0 days.

(21) Appl. No.: 14/941,441

(22) Filed: Nov. 13, 2015

(65) Prior Publication Data
US 2016/0142165 A1 May 19, 2016

(30) Foreign Application Priority Data

Nov. 14, 2014 (JP) ................. 2014-232225

(51) Int. Cl.
H04B 1/00 (2006.01)
H04H 60/04 (2008.01)
G11B 27/34 (2006.01)

(52) U.S. Cl.
CPC ............ H04H 60/04 (2013.01); G11B 27/34 (2013.01)

(58) Field of Classification Search
CPC ...... H04H 60/04; G11B 27/34; G11B 27/028; G11B 27/034; G11B 27/038; G11B 27/031
USPC ........................................................ 381/119
See application file for complete search history.

(56) References Cited

U.S. PATENT DOCUMENTS

| 8,050,426 | B2 | 11/2011 | Okabayashi et al. |
| 2002/0037085 | A1 | 3/2002 | Ono |
| 2005/0055117 | A1 | 3/2005 | Holton |
| 2007/0067055 | A1* | 3/2007 | Terada ............... H04H 60/04 700/94 |

(Continued)

FOREIGN PATENT DOCUMENTS

| JP | 2011-109554 A | 6/2011 |
| JP | 2011-234283 A | 11/2011 |

OTHER PUBLICATIONS

Extended European Search Report dated Apr. 19, 2016, for EP Application No. 15194449.3, nine pages.

(Continued)

Primary Examiner — Matthew Eason
Assistant Examiner — Sabrina Diaz
(74) Attorney, Agent, or Firm — Morrison & Foerster LLP (57) ABSTRACT A mixing console includes: a plurality of operating regions provided by dividing an operation panel of the mixing console into a plurality of regions, wherein a plurality of channels are allocated to each of the plurality of operating regions. Each of the operating regions includes each of channel selectors, respectively. Each of the channel selectors is configured to select one of the plurality of channels allocated to the operating region corresponding to the channel selector as a selected channel, and to set a plurality of parameters for signal processing on audio signals of the selected channel. Thus, a plurality of selected channels can be selected, and values of the parameters of the plurality of selected channels can be adjusted promptly and in real-time.

4 Claims, 6 Drawing Sheets (56) References Cited

U.S. PATENT DOCUMENTS

2010/0309153 A1* 12/2010 Terada ................. G06F 3/0488
                                                            345/173

OTHER PUBLICATIONS

Yamaha. (2012-2013). Digital Mixing Console, CLs, CL3, CL1, Owner's Manual, Yamaha Manual Library <http://www.yamaha.co.jp/manual/>, 66 pages.
Yamaha. (Date Unknown). "PM1D Version 2, Digital Audio Mixing System," Yamaha Corporation, Hamamatsu, Japan, 12 pages.

* cited by examiner

MIXING CONSOLE

BACKGROUND

The present invention relates generally to mixing consoles well suited for use in signal processing on audio signals, for example, in a concert hall, recording studio or the like, and more particularly to an improvement of operability of an operation panel operable by a user in a mixing console.

Heretofore, digital mixing consoles (hereinafter referred to simply as "mixers") have been known which perform signal processing on audio signals of a plurality of channels solely through digital processing. Generally, such mixers include, on an operation panel provided on the upper surface of a casing, a channel strip section comprising a plurality of channel strips, and the mixers are constructed to set values of primary parameters for signal processing to be performed on audio signals of channels allocated to the individual channel strips by using a manual control (such as a fader) of each channel strip. For such mixers, a channel selection function has heretofore been known which selects any one of the plurality of channels allocated to the channel strips and adjusts values of various parameters of the selected one channel.

The conventionally-known channel selection function is arranged to select one channel as an object of operation for one mixer. In this connection, the mixer disclosed in Japanese Patent Application Laid-open Publication No. 2011-109554 (hereinafter referred to as "Patent Literature 1") includes a multipurpose display and can set whether a detailed setting screen relating to one channel selected in response to a channel selection operation should be displayed on the display (interlock ON) or a channel to be displayed on the detailed setting screen should not be changed even if the channel selection operation is performed and a channel having been displayed on the screen till the channel selection operation should be maintained (interlock OFF). In this case, the channel to be displayed on the screen can be made independent of the channel set as a current object of operation of the channel selection function. However, with the construction disclosed in Patent Literature 1, there is a need to perform an operation combining an interlock ON/OFF setting operation and the channel selection operation, which is very cumbersome.

Further, the mixer, disclosed in "YAMAHA PM1D Version DIGITAL MIXING CONSOLE" by YAMAHA Corporation found at the following Internet URL: http://proaudio.yamaha.co.jp/downloads/brochures/mixers/pm1dv2 brochure ja.pdf, which is an online product brochure prepared in November 2005 (searched on Oct. 9, 2014) (hereinafter referred to as "Non-Patent Literature 1"), includes, on an operation panel, a selector channel section for input channels and a selector channel section for output channels, with which one channel each can be selected from the input channels and the output channels. However, this only allows one channel each to be selected from the input channels and the output channel. Moreover, areas on the operation panel for operating the selected channels are fixed, that is, fixed areas are provided for the input channels and the output channels, separately.

Further, the mixer, disclosed in the "YAMAHA DIGITAL MIXING CONSOLE CL5/CL3/CL1/Owner's Manual" published by YAMAHA Corporation and found at the following Internet URL: http://www2.yamaha.co.jp/manual/pdf/pa/japan/mixers/c15_ja_om_d0.pdf?_ga=1.84715153.902378368.1413248849, which is an online document published in 2012 (searched on Oct. 9, 2014) (hereinafter referred to as "Non-Patent Literature 2"), is configured such that combinations of the channels allocated to a channel strip group is switched collectively by each fader bank, and each fader bank holds information that specifies the one selected channel. In this case as well, only one channel can be set as the object of operation on the operation panel.

As described above, a conventional selection function basically provides selection of one channel for one mixer, and thus, it is impossible to select a plurality of channels to promptly operate the values of the parameters of the plurality of channels.

SUMMARY OF THE INVENTION

In view of the foregoing prior art problems, it is an object of the present invention to provide a mixing console that can select a plurality of channels as the object of operation of the channel selector and that can promptly set the values of the parameters of the plurality of selected channels.

In order to accomplish the aforementioned object, the present invention provides an improved mixing console for controlling signal processing on audio signals of a plurality of channels, which comprises: a plurality of operating regions provided by dividing an operation panel of the mixing console into a plurality of regions, a plurality of channels being allocated to each of the plurality of operating regions; and a plurality of channel selectors provided in corresponding relation to the plurality of operating regions, each of the plurality of channel selectors configured to select one of the plurality of channels allocated to the operating region corresponding to the channel selector, wherein the operating region corresponding to the channel selector is configured to set a plurality of parameters for signal processing on an audio signal of the one channel selected by the channel selector.

According to the mixing console of the present invention, the operation panel is divided into a plurality of operating regions, and the channel selectors are provided according to each operating region. Therefore, it is possible to select a channel as an object of operation of the channel selector independently for each operating region so as to set the values of a plurality of parameters of the selected channel independently for each operating region. Accordingly, it is possible for a human operator (i.e., user) to set a detailed parameter value of a plurality of selected channels by efficiently using the channel selectors for each of the plurality of operating regions. The channel selection operation for each channel selector and the operation for adjusting the detailed parameter values can be implemented promptly according to each operating region on the operation panel, for example, without requiring setting change operation such as switching of hierarchy. Accordingly, compared to the digital mixer with which only one channel can be selected as an object of operation of the channel selector per mixer, operability in terms of adjustment of the detailed parameter values of the plurality of channels is improved.

Further, the mixing console according to an embodiment of the present invention further includes an interlocking controller configured to interlock the channel selector between or among two or more operating regions. By providing the interlocking controller in the mixing console, it becomes possible to interlock channel selectors of two or more operating regions in an arbitrary combination, and the degree of freedom in using the channel selector for each of the plurality of operating regions increases. For example, by interlocking the channel selectors in all operating regions, the mixing console can be used in the same manner as a conventional mixing console, in which only one selected channel can be selected on one mixing console. In addition, if the channel selectors are interlocked so as to allow two channels to be selected on one mixing console, "two-man operation" of the mixing console, that is, operation of one mixing console with two human operators, will become possible.

Further, in the mixing console according to an embodiment of the present invention, each of the plurality of operating regions may include a first operating section comprising a plurality of physical controls and a second operating section comprising at least a display, and the channel selector corresponding to each of the plurality of operating regions may comprise first and second channel selectors provided in corresponding relation to the first and second operating sections included in the corresponding operating region. In this case, the mixing console may further comprise an interlocking controller configured to interlock the first and second channel selectors between or among one or more operating regions.

The mixing console according to the present invention provides a superior effect that a plurality of channels can be selected as objects of operation in the channel selectors, and that the values of the parameters for a plurality of selected channels can be set promptly and in real-time.

BRIEF DESCRIPTION OF THE DRAWINGS

Certain preferred embodiments of the present invention will hereinafter be described in detail, by way of example only, with reference to the accompanying drawings, in which:

FIGS. 12A and 12B are configuration examples of the mixing console according to a third embodiment.

DETAILED DESCRIPTION

Figure 1:
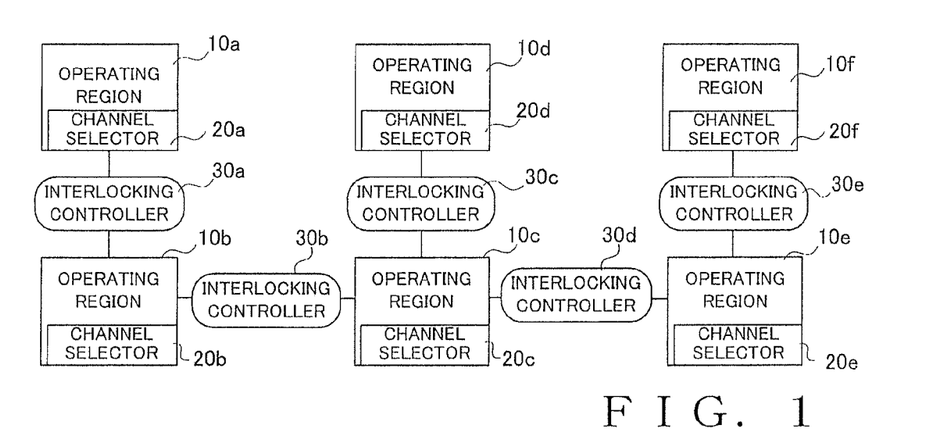
FIG. 1 is a block diagram illustrating a configuration example of a mixing console according to the present invention.

FIG. 1 is a block diagram illustrating a configuration example of a mixing console (hereinafter referred to as a "mixer") according to the present invention. The mixer exemplified in FIG. 1 includes a plurality of operating regions 10a to 10f provided by dividing an operation panel into a plurality of regions, and a plurality of channels are allocated to each of the plurality of operating regions 10a to 10f. Each of the operating regions 10a to 10f includes channel selectors 20a to 20f, respectively. Each of the plurality of channel selectors 20a to 20f may select one of the plurality of channels allocated to the operating regions 10a to 10f corresponding to the channel selectors 20a to 20f, and may set a plurality of the values of parameters for signal processing on audio signals of the selected channel. Note that, in the description below, a "function for selecting a channel by a channel selector" is also referred to as an "SEL function." The one channel selected as an object of operation by the channel selector is also referred to as a "selected channel." Note that, in the present specification, when individually distinguishing a plurality of components from one another, such as when referring to the operating regions 10a to 10f, for example, a reference numeral accompanied by an alphabet, such as "10a" and "10b" will be used. However, if the components do not need to be individually distinguished from one another, a reference numeral constituted only by a numerical number, such as "10," for example, will be used as a reference numeral.

The mixer includes an interlocking controller 30 that interlocks the channel selectors 20 between or among two or more operating regions 10. In the example shown in FIG. 1, an interlocking controller 30a is provided between operating regions 10a and 10b, an interlocking controller 30b is provided between 10b and 10c, an interlocking controller 30c is provided between 10c and 10d, an interlocking controller 30d is provided between 10c and 10e, and an interlocking controller 30e is provided between 10e and 10f. Each of the interlocking controllers 30a to 30e selects whether to interlock the channel selectors 20 between the two operating regions 10, that is, switches between "interlock ON" and "interlock OFF" of the SEL function. In the case where the SEL function is set to interlock ON, if a certain channel is selected by one of the channel selectors 20 of the two operating regions 10, this channel is also selected as the selected channel of the other channel selector 20. In the case where the SEL function is set to interlock OFF, each channel selector 20 can select a channel independently of other channel selectors.

Figure 2:
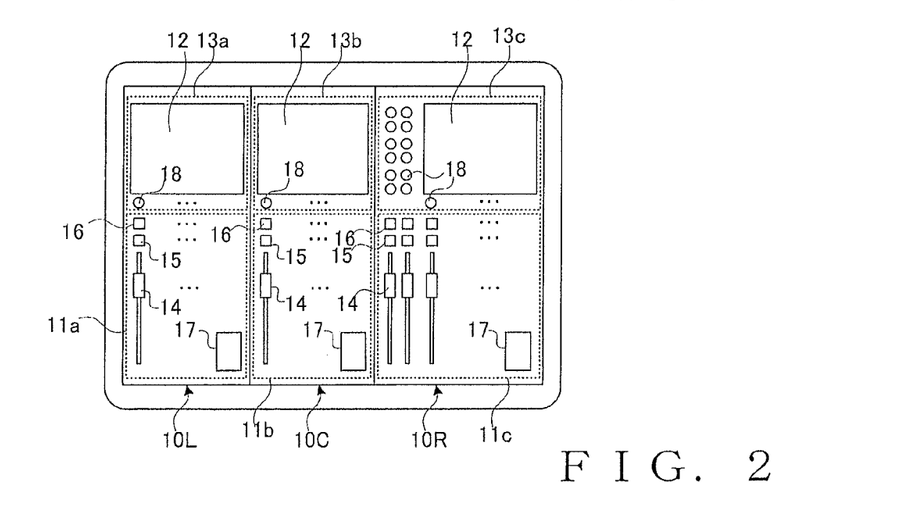
FIG. 2 is a diagram illustrating an example of an operation panel provided on the mixing console according to one embodiment.
Figure 3:
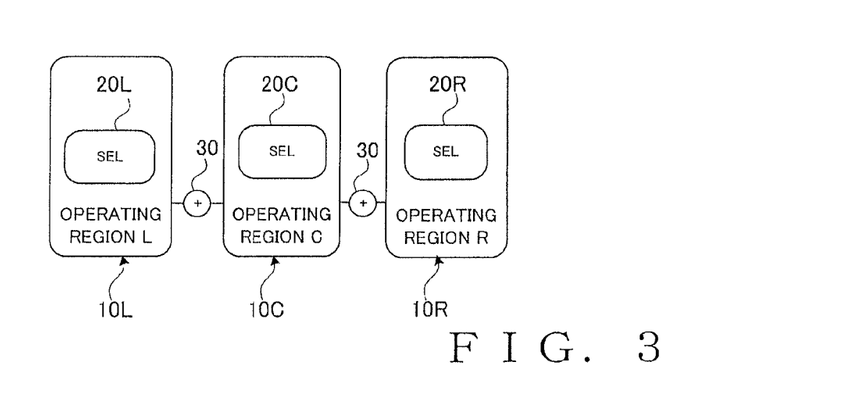
FIG. 3 is a block diagram illustrating a configuration example for interlockingly controlling three operating regions and the channel selectors provided in each of the operating regions in the mixing console shown in FIG. 2.

FIG. 2 is a diagram illustrating a configuration example of an operation panel of the mixer. The mixer shown in FIG. 2 is assumed to be a digital mixer in which signal processing on audio signals of a plurality of channels is performed by digital processing. In the example shown in FIG. 2, the operation panel is divided into three operating regions, an operating region 10L ("operating region L"), an operating region 10C ("operating region C"), and an operating region 10R ("operating region R"). The operating regions 10L, 10C and 10R include channel selectors (reference numerals 20L, 20C and 20R as shown in FIG. 3 described later). Each of the operating regions 10L, 10C and 10R includes one of manual controls areas 11a, 11b, 11c each including a plurality of physical controls 14 and 15, and one of display areas 13a, 13b, 13c each including at least a display 12. In FIG. 2, the manual controls areas 11a to 11c and the display areas 13a to 13c are respectively surrounded by dotted lines. Each of the manual controls areas 11a, 11b and 11c functions as a first operating section, and each of the display areas 13a, 13b and 13c functions as a second operating section. A user can set desired mixing parameters using both or either of the first and second operating sections. As mentioned below, the second operating section, i.e., display areas 13a, 13b and 13c, may include one or more physical controls for use of setting desired mixing parameters in combination of the display 12.

Each of the manual controls areas 11a to 11c includes a plurality of physical controls such as a fader 14 and a button switch 15 provided for each of the plurality of channel strips (an operation section for each channel). For each channel strip, one of a plurality of channels allocated to one operating region 10 to which the channel strip belongs is allocated to the channel strip. A human operator can adjust a part of (major part of) the values of the parameters of signal processing on audio signals of the channel allocated to each channel strip using a fader and the like of that channel strip.

In addition, each of the manual controls areas 11a to 11c has, in corresponding relation to the channel strip in each area, a channel selecting switch 16 for selecting the channel. The "channel selecting switch" is referred to as "SEL switch" hereinafter. When a certain SEL switch 16 is set to ON by operation of a human operator, a CPU (denoted by reference numeral 31 in FIG. 4 described later) selects the channel allocated to the channel strip corresponding to that SEL switch 16 as the selected channel in that manual controls area 11.

Further, each of the manual controls areas 11a to 11c may include a sub-display 17 capable of displaying various information. Each of the sub-displays 17 is constituted by an LCD or an LED, and can display various information including information on the selected channel and the like, for example, based on instructions from the CPU (denoted by reference numeral 31 in FIG. 4 described later).

The display 12 in each of the display areas 13a to 13c may be constituted by a touch panel that allows an input by contact operation onto a screen of a display device such as an LCD or an LED, and can display various visual screens including a detailed setting screen and the like of the selected channel, for example, based on the instructions from the CPU (denoted by reference numeral 31 in FIG. 4 described later).

Also, each of the display areas 13a to 13c may include one or more physical controls 18 for implementing an operation relating to an image object displayed on the display 12. Note that, in the example shown in FIG. 2, while the configuration of a plurality of the physical controls 18 included in the display area 13c is different between those of the display areas 13a, 13b, the configurations of the physical controls 18 in all of the display areas 13a, 13b, 13c may be identical.

FIG. 3 illustrates a configuration example for interlockingly controlling the three operating regions and the SEL function in each of the operating regions in the mixing console shown in the aforementioned FIG. 2. In the configuration example shown in FIG. 3, the interlocking controller 30 can make interlock ON/OFF setting between the SEL function 20L of the operating region 10L and the SEL function 20C of the operating region 10C as well as interlock ON/OFF setting between the SEL function 20C of the operating region 10C and the SEL function 20R of the operating region 10R. Note that a specific example of a combination of the interlock ON/Off setting will be described later.

Figure 4:
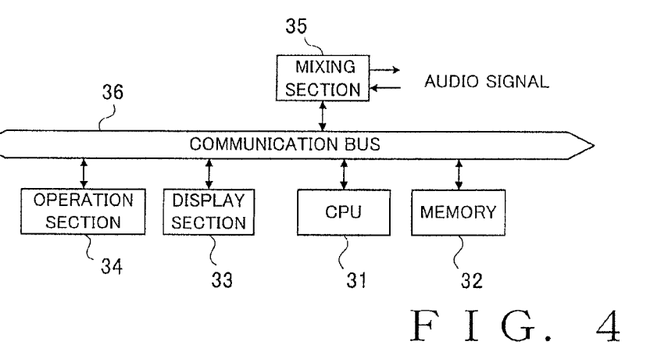
FIG. 4 is a block diagram illustrating an electrical hardware configuration example of the mixing console shown in FIG. 2.

FIG. 4 is a block diagram illustrating an electrical hardware configuration example of the mixer shown in FIG. 2. The mixer includes a central processing unit (CPU) 31, a memory 32, a display section 33, an operation section 34, and a signal processing section 35. The signal processing section 35 may be referred to as "mixing section" hereinafter. The CPU 31, the memory 32, the display section 33, the operation section 34, and the mixing section 35 are connected via a communication bus 36 so that various control signals can be communicated between the CPU 31 and each of the sections 32 to 35. In addition, analog audio signals or digital audio signals may be input to the mixing section 35 from an input device such as a microphone and an audio reproduction device, and analog audio signals or digital audio signals may be output from the mixing section 35 to an output device such as an amplifier and a loudspeaker.

The CPU 31 controls an overall behavior of the mixer by executing various programs stored in the memory 32. The memory 32 stores various programs to be executed by the CPU 31 and various data in a nonvolatile manner. Also, the memory 32 is used in a loading area and a working area of the program to be executed by the CPU 31. The memory 32 may be constituted by appropriately combining various memory devices such as a read-only memory, a random access memory, a flash memory and a hard disk.

The display section 33 is constituted by the display 12, the sub-display 17, a related interface circuit and the like, and displays various information based on display control signals supplied by the CPU 31 in the form of various graphics, letter and/or character strings, and the like. The operation section 34 is constituted by the plurality of manual controls of the manual controls area 11, the physical controls 18 of the display area 13, the related interface circuit, and the like. A human operator can operate various manual controls of the operation section 34 to set or change various parameters. The CPU 31 acquires a detection signal responsive to an operation of the operation section 34 by the human operator to control the behavior of the mixer based on the detected signal.

The mixing section 35 is constituted by, for example, a DSP (Digital Signal Processor) and a signal processing device virtually realized by the CPU 31 and the software stored in the memory 32. The mixing section 35 executes a program for signal processing to process audio signals of one or more systems (or channels) supplied via an input device (not shown) and output the processed audio signals to an output device (not shown). The signal processing performed by the mixing section 35 at least includes a mixing processing for mixing audio signals of at least a plurality of systems (or channels). This signal processing is controlled based on various parameter values stored in the memory 32. The memory 32 stores therein a plurality of parameters used in signal processing of each channel corresponding to the plurality of channels provided in the mixer.

Figure 5:
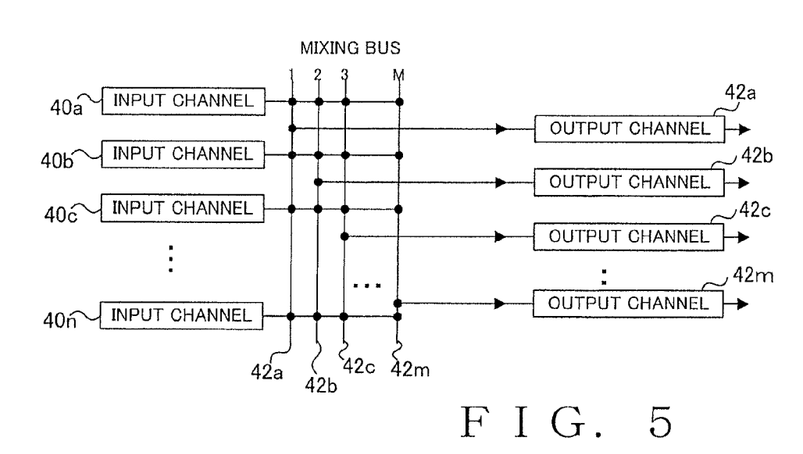
FIG. 5 is a block diagram illustrating a configuration of signal processing function of the mixing console shown in FIG. 2.

FIG. 5 is a block diagram illustrating a configuration of signal processing function of the mixer. Behaviors of elements shown in FIG. 5 are realized by digital signal processing by the mixing section 35. The mixer has a plurality of input channels 40a to 40n. Each of the input channels 40a to 40n receives the audio signals from an input port (not shown) provided in corresponding relation to the input channels 40a to 40n to perform signal processing based on the values of various parameters of the input channels 40a to 40n. Then, the processed audio signals are output to mixing buses 42a to 42m (signals may be output to all bus lines or selectively to some bus lines). Further, the mixer has a plurality of output channels 44a to 44m, and each of the output channels 44 is provided in corresponding relation to one of the bus lines of mixing buses 42a to 42m. Each of the output channels 44a to 44m implements signal processing on the audio signals output from the corresponding bus lines based on the values of various parameters of each channel. Signal processing performed for the input channels 40a to 40n and the output channels 44a to 44m is, for example, volume level adjustment, equalizing, panning, applying various effects, and the like based on the values of various parameters stored in the memory 32.

Next, an interlock setting of the SEL functions 20L, 20C and 20R provided in the operating regions 10L, 10C and 10R, respectively, will be described. The interlock setting of the SEL function can be implemented on a preference setting screen (not shown) displayed on the display 12, for example. The combination of two or more operating regions 10 for which the SEL function will be interlocked may be arbitrarily designated by a human operator. Instead, the human operator may have an opportunity to select one combination from a predetermined set of combination patterns.

Once the interlock setting of the SEL function performed by the human operator has been completed, the CPU 31 stores interlocking control information that indicates the combination of the operating regions 10 for which the set SEL function should be interlocked. The interlocking control information is, for example, information that indicates an interlock ON/OFF setting state between or among two or more operating regions 10. When a particular channel is selected by operation of a particular SEL switch 16, the CPU 31 selects, as a selected channel of one operating region 10 to which that the operated SEL switch 16 belongs, a channel corresponding to the operated SEL switch 16. At the same time, the CPU 31 specifies, based on the interlocking control information stored in the memory 32, all other operating regions 10 which are set to be interlocked (interlock ON) with the one operating region 10 to which the operated SEL switch 16 belongs, and interlocks the SEL functions of all other operating regions 10 that have been specified. In other words, in the case where a selected channel for a particular operating region (for example, 10L) is changed by turning ON a particular SEL switch 16 in the operating region (10L), the same channel as the selected channel by the operated SEL switch 16 will be selected too as a selected channel in the SEL functions of all other operating regions (e.g., 10C) that are set to be interlocked with the operating region (10L). Further, when a selected channel of a particular operating region (e.g., 10R) is changed by turning ON a particular SEL switch 16 in the operating region (10R), the selected channel will only be changed in that operating region (10R) if the SEL function of the operating region (10R) is not interlocked (interlock OFF) with any other operating region. The behavior of the CPU 31 based on the above-mentioned interlocking control information corresponds to the behavior of the interlocking controller 30.

Figure 6A:
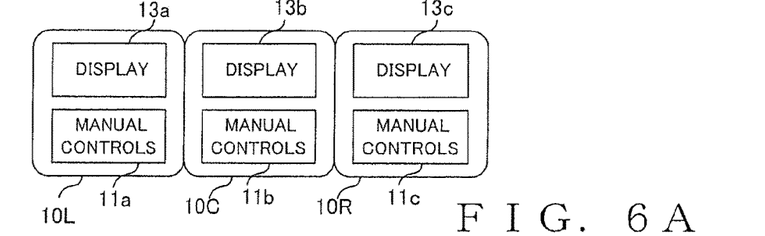
FIGS. 6A through 6C are diagrams illustrating specific examples of interlocking settings of the channel selectors in the mixing console exemplified in FIG. 2, FIG. 6A illustrating an example in which each of the channel selectors in the three operating regions is independent of other channel selectors, FIG. 6B illustrating an example in which all of the channel selectors in the three operating regions are interlocked, and FIG. 6C illustrating an example in which the channel selectors of two adjacent operating regions are interlocked.

FIGS. 6A, 6B, 6C illustrate specific examples of combinations of the operating regions 10L, 10C and 10R, for which the SEL function 20 will be interlocked. FIG. 6A illustrates an example in which interlocking of the SEL function is set to OFF in all of the operating regions 10L, 10C and 10R. In this case, channels will be selected independently by each of the SEL functions 20L, 20C and 20R of the respective operating regions 10L, 10C and 10R. When a channel is selected, the detailed setting screen (refer to FIG. 7 to be described later) for setting the parameters of the respective selected channels will be displayed on the display 12 of the operating regions 10L, 10C and 10R by the CPU 31 based on the values of various parameters corresponding to the selected channel stored in the memory 32. The human operator, using the display 12, the controls 18, and the like in the display areas 13a, 13b, 13c of the respective operating regions 10L, 10C and 10R, can adjust the detailed parameter values of the selected channel selected by the corresponding SEL functions 20L, 20C or 20R.

If the mixer is used as shown in the aforementioned FIG. 6A, three channels can be selected simultaneously on one mixer. Thus, the human operator can efficiently use the three operating regions 10L, 10C and 10R provided on one mixer to set detailed parameter values of the three selected channels. The mixer is configured such that the channels are selected for each of the operating regions 10L, 10C and 10R, and the values of the parameters are set for the selected channels. Accordingly, correlation between the selected channel and a user interface (operating region 10) for operating that channel is easy for the human operator to understand, despite the fact that the mixer requires a plurality of selected channels to be handled simultaneously on one mixer. Channel selecting operation for each of the operating regions 10L, 10C and 10R and adjusting operation of the detailed parameter values can be promptly implemented using the controls 14, 15, 18, the display 12 and the like, in each of the operating regions 10 on the operation panel without requiring setting change operation such as switching of hierarchy. Accordingly, compared to the conventional digital mixer with which only one channel can be selected per mixer, operability in terms of adjustment of the detailed parameter values of the plurality of channels is improved.

Figure 6B:
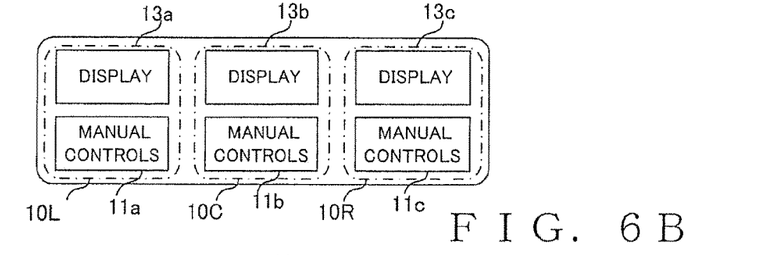

FIG. 6B illustrates an example in which the SEL functions 20L, 20C and 20R of all the operating regions 10L, 10C and 10R are set to interlock ON, as another example of interlock setting of the SEL function. In this case, when the selected channel is selected by any one of the operating regions 10L, 10C and 10R, the same channel will become the selected channel for the SEL functions 20L, 20C and 20R. As a result, apparently, the one mixer will have one SEL function 20. In the case where the SEL functions 20 of two or more operating regions 10 are interlocked in this way, the CPU 31 may display the detailed setting screen of the selected channel on at least one of the displays 12 of all the operating regions 10 to be interlocked. Instead, the CPU 31 may display the detailed setting screen of the selected channel on the display 12 of all the operating regions 10 to be interlocked.

Figure 6C:
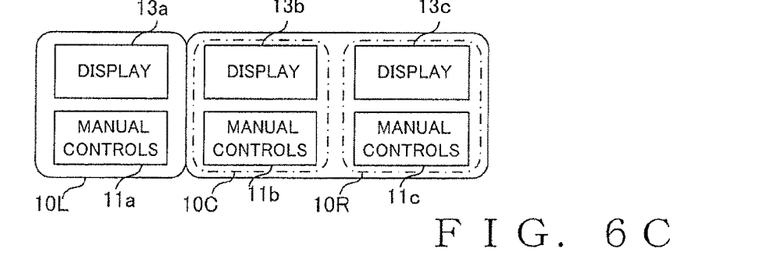

FIG. 6C illustrates an example in which the SEL functions 20C, 20R of two adjacent operating regions 10C, 10R are set to interlock ON and only the SEL function 20L of the operating region 10L is independent of other SEL functions 20, as still another example of interlock setting of the SEL function. In this case, if one selected channel is selected on one of the operating regions 10C and 10R, the same channel will also become the selected channel for the other of the operating regions 10C and 10R, and the detailed setting screen of the selected channel of the display 12 of at least one of the operating regions 10C and 10R will be displayed. On the other hand, a channel is selected at the operating region 10L independently of the other operating regions 10C and 10R. As a result, apparently, two operating regions 10C and 10R share one SEL function 20 and the one operating region 10L will have one SEL function 20. Accordingly, the operation panel of one mixer may be divided into two parts each having the SEL function 20. Note that, in addition to the above example, the SEL function 20L and the SEL function 20R may be interlocked while the SEL function 20C may be independent.

Figure 7:
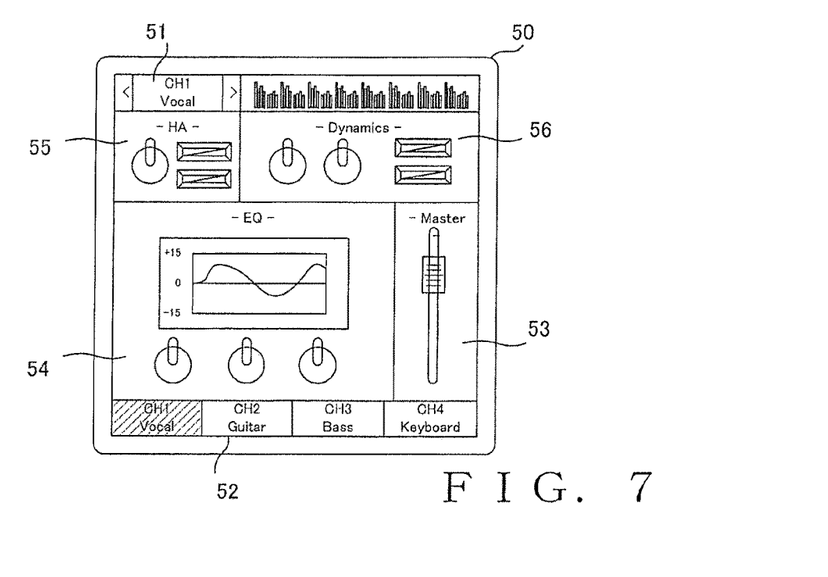
FIG. 7 is a diagram illustrating an example of a detailed setting screen displayed on a display of the mixing console shown in FIG. 2.

FIG. 7 illustrates an example of a detailed setting screen displayed on the display 12. In FIG. 7, a channel name display area 51 provided on an upper side of a detailed setting screen 50 displays a channel name ("CH1 Vocal" in the figure) of the currently selected channel. A channel name display area 52 provided on a lower side of the screen 50 displays a plurality of channel names side by side in a horizontal direction of the screen (e.g., "CH1 Vocal," "CH2 Guitar," "CH3 Bass," and "CH4 Keyboard" as shown in the figure), and the channel name of the currently selected channel ("CH1 Vocal" as shown in the figure) is displayed in a different manner from those of other channel names, for example, by hatching the channel name. The CPU 31 specifies the selected channel according to each operating region 10, and controls display of the channel name display areas 51 and 52 based on information on the specified selected channel stored in the memory 32. Also, the detailed setting screen 50 displays images 53, 54, 55 and 56 indicative of a master volume level, equalizer, head amplifier gain, dynamics and the like. The CPU 31 executes control so as to display the values of applicable parameters on the images 53, 54, 55 and 56 based on the values of various parameters corresponding to each of the selected channels stored in the memory 32. The human operator may select, for example, the images 53, 54, 55 or 56 displayed on the screen by touching operation of the screen, and adjust the value of the parameter corresponding to the selected images 53, 54, 55 or 56 using the physical manual control 18 corresponding to the display 12 that has the applicable image displayed thereon. The CPU 31, in accordance with the operation of the physical manual control 18, changes the value of the parameter corresponding to the operation which is stored in the memory 32. Note that the detailed setting screen 50 of the selected channel may be displayed on the sub-display 17.

Further, the channel name display area 51 or 52 may be configured such that the channel name display area 51 or 52 functions as an SEL switch image for selecting the channel to be displayed on the detailed setting screen 50. To be specific, as shown in FIG. 7, images of right and left arrows are displayed on right and left ends of the channel name display area 51, and a channel will be selected by the human operator touching one of the arrow images. Instead, the channel may be selected by the human operator touching one of a plurality of channel names displayed on the channel name display area 52. When the selected channel is changed on one of the channel name display areas 51 and 52, the CPU 31 changes the selected channel to be displayed on the other of the channel name display areas 51 and 52 accordingly such that only one channel is selected in one screen 50. In addition, the selection of a channel by the channel name display area 51 or 52 may be made to function as the SEL function 20 of the applicable operating region 10.

Figure 8:
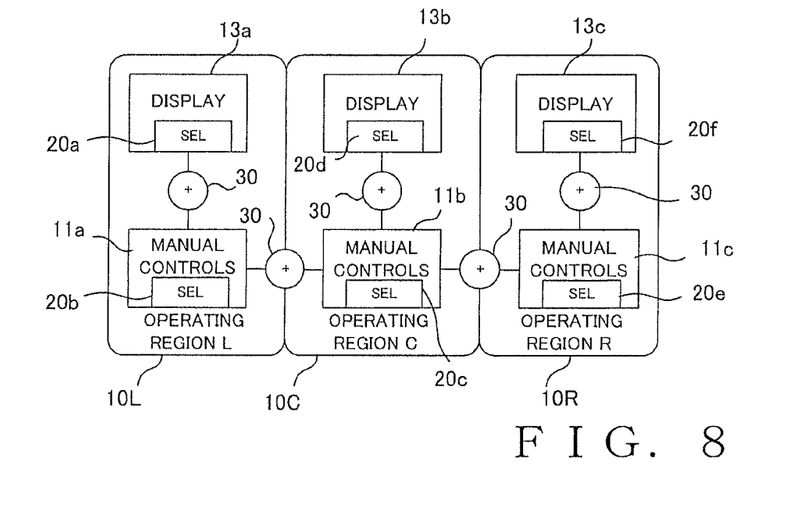
FIG. 8 is a block diagram illustrating a configuration example of another embodiment of the mixing console, in which the channel selectors are provided in a manual controls area and a display area of each of the operating regions.

FIG. 8 is a configuration example of the second embodiment of the mixing console, in which corresponding one of the manual controls areas 11a to 11c (i.e., the first operating section) and corresponding one of the display areas 13a to 13c (i.e., the second operating section) included in each of the operating regions 10L, 10C and 10R independently have first and second channel selectors, namely SEL functions 20a and 20b (or 20c and 20d, or 20e and 20f), respectively. In this case, the selected channels for the SEL functions 20b, 20c, 20e of the manual controls areas 11a, 11b and 11c can be selected by using the SEL switch 16 in each of the manual controls areas 11 as the first channel selector. Also, the selected channels for the SEL functions 20a, 20d, 20f of the display areas 13a to 13c can be selected by using SEL switch images (channel name display areas 51, 52) in the detailed setting screen 50 displayed on the display 12 as the second channel selector.

Also in the mixer configuration example shown in FIG. 8, the interlocking controller 30 can be interlocked with two or more SEL functions 20a to 20f in an arbitrary combination. In the example shown in FIG. 8, the interlocking controller 30 can set the SEL function 20 to interlock ON/OFF between the manual controls area 11a and the display area 13a of the operating region 10L, between the manual controls area 11b and the display area 13b of the operating region 10C, between the manual controls area 11c and the display area 13c of the operating region 10R, between the manual controls area 11a of the operating region 10L and the manual controls area 11b of the operating region 10C, and between the manual controls area 11b of the operating region 10C and the manual controls area 11c of the operating region 10R. Namely, the interlocking controller 30 is configured to interlock the first and second channel selectors 20a to 20f between or among desired one or more operating regions 10L, 10C and 10R.

Figure 9:
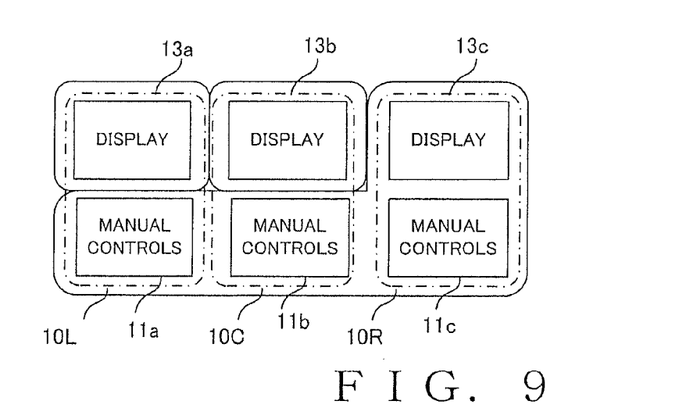
FIG. 9 is a diagram illustrating a specific example of an interlock setting of the channel selectors of the mixing console shown in FIG. 8.

FIG. 9 is an example of an interlock setting of each of the SEL functions 20a to 20f shown in the aforementioned FIG. 8, in which the SEL functions 20b, 20c, 20e and 20f of all the manual controls areas 11a to 11c and one display area 13c, respectively, are set to interlock ON, while the respective SEL functions 20a, 20d of the display area 13a of the operating region 10L and the display area 13b of the operating region 10C are made independently. In this case, when a certain channel is selected in the manual controls areas 11a, 11b, 11c and the display area 13c, the selected channel will become the selected channel of the SEL function for all of the manual controls areas 11a, 11b, 11c and the display area 13c. However, the channel for the SEL function can be selected independently at the display areas 13a and 13b.

Note that, as exemplified in FIGS. 8 and 9, in a configuration in which each of the manual controls areas 11a to 11c and the display areas 13a to 13c has the SEL function 20, respectively, the detailed setting screen of the selected channel can be displayed on the sub-displays 17 of the manual controls areas 11a to 11c in the case where the SEL functions of each of the manual controls areas 11a to 11c are to be used independently, or in the case where the SEL functions of two or more manual controls areas 11a to 11c are to be interlocked. By configuring the manual controls areas 11a to 11c and the display areas 13a to 13c as thus, the operating regions 10 can be used in flexible combinations.

Figure 10:
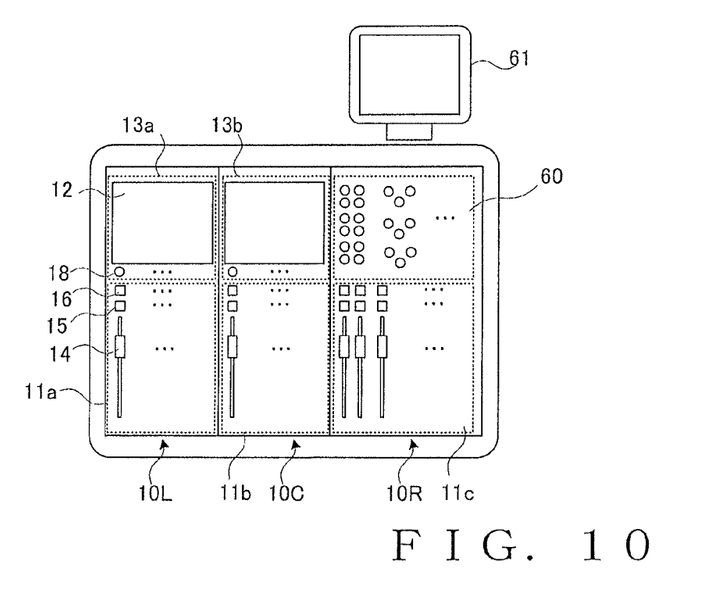
FIG. 10 is a diagram illustrating a configuration example of an operation panel in the mixing console according to still another embodiment.

FIG. 10 is a diagram illustrating a configuration example of an operation panel in the mixer according to another embodiment. Components shown in FIG. 10 that have already been described with reference to FIG. 2 are denoted by the same reference numerals as in FIG. 2, and reference thereto will be omitted, as appropriate. In the configuration example of the operation panel illustrated in FIG. 10, a selected channel area 60 constituted by a plurality of physical controls for adjusting the values of the parameters of the selected channel is provided in the operating region 10R in place of the display area 13c (refer to FIG. 2, and the like). In addition, an external display 61 is connected to the mixer. The external display 61 is capable of displaying the detailed setting screen 50 shown in the aforementioned FIG. 7, for example, and the channel name display areas 51 and 52 of the detailed setting screen 50 function as the SEL switch images. Operation on the external display 61 can be made, for example, via a touch panel.

Figure 11:
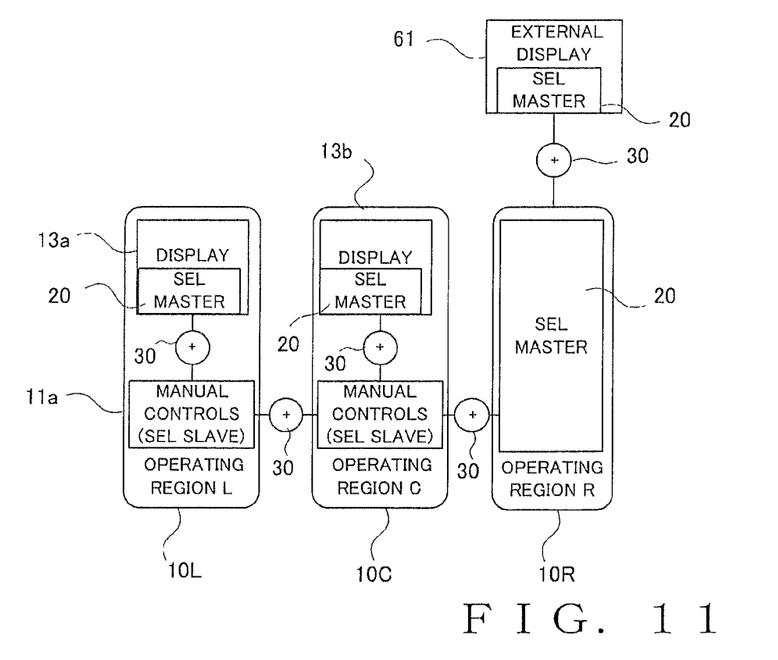
FIG. 11 is a block diagram illustrating a configuration example for interlockingly controlling the plurality of channel selectors in the mixing console shown in FIG. 10.

The mixer illustrated in FIG. 10 is assumed to be configured by having, as an example, one SEL function 20 in the operating region 10R, one independent SEL function 20 in each of the display areas 13a and 13b of the operating regions 10L and 10C, and one SEL function 20 in the external display 61. Note that, for the convenience of description, these four SEL functions 20 may also be referred to as a "SEL master." In this case, as shown in FIG. 11, the interlocking controller 30 can set the SEL function to interlock ON/OFF between the manual controls area 11a of the operating region 10L and the display area 13a of the operating region 10L, between the manual controls area 11a of the operating region 10L and manual controls 11b of the operating region 10C, between the manual controls area 11b of the operating region 10C and the display area 13b of the operating region 10C, between the manual controls area 11b of the operating region 10C and the operating region 10R, and between the operating region 10R and the external display 61.

The operation panel shown in FIG. 10 may be, as an example, configured such that the manual controls area 11a of the operating region 10L and 11b of the operating region 10C do not have independent SEL functions, and that the SEL functions (SEL slave) using these areas 11a, 11b become effective only when the areas 11a, 11b are interlocked with the SEL function (SEL master) 20 provided in other elements. In other words, the operation panel may be configured such that the channel selection is made in accordance with the operation of the SEL switch 16 of the areas 11a and 11b. In this case, if the manual controls areas 11a and 11b are not interlocked with any one of the SEL masters, the SEL slave function will be invalid, and switching of the selected channel will not occur even if the SEL switches 16 of the areas 11a and 11b are operated.

Figure 12A:
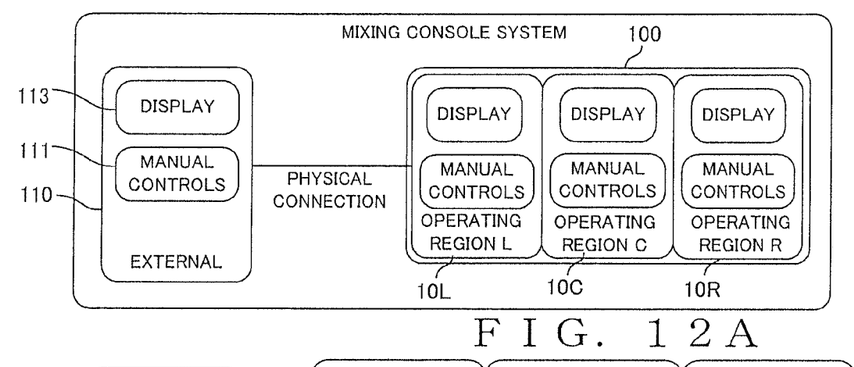
FIG. 12A is a block diagram illustrating a configuration example of a mixing console system configured by connecting the mixing console shown in FIG. 2 to a separately provided operating region unit.
Figure 12B:
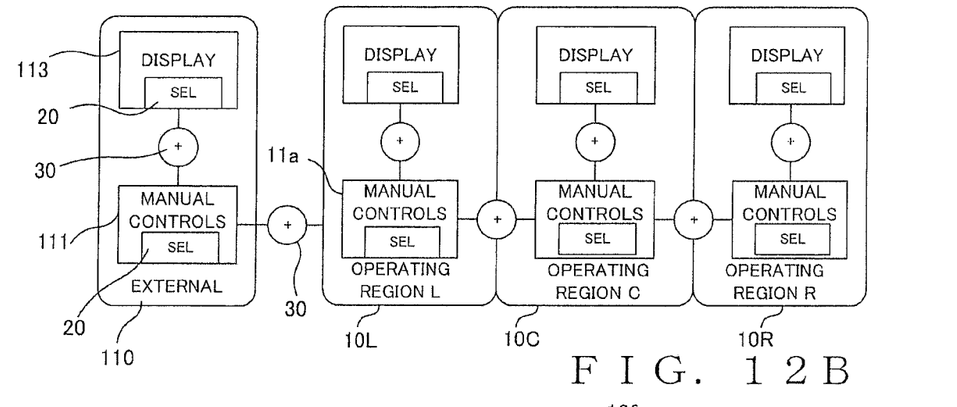
FIG. 12B is a block diagram illustrating a configuration example for interlockingly controlling the channel selectors on the mixing console side and the channel selectors on the separately provided operating region unit side in the mixing console system shown in FIG. 12A.

In still another embodiment, an external operating region unit can be connected to the mixer. FIGS. 12A and 12B illustrate a configuration example of a mixer system in which an external operating region unit 110 is connected to a mixer 100 via a physical connection. The mixer 100 is configured similarly to the mixer shown in FIG. 8, and includes three operating regions 10L, 10C, 10R and the SEL functions 20 in the manual controls area 11 and the display area 13 of each of the operating regions 10. The operating region unit 110 is a separate device from the mixer 100, and includes a manual controls area 111 and a display area 113. The manual controls area 111 and the display area 113 include, respectively, a plurality of manual controls for each channel strip, a display, and a group of the physical controls relating to the display. Further, the manual controls area 111 and the display area 113 each has an independent SEL function 20. In such a mixer system, the interlocking controller 30 can, as shown in FIG. 12B, set the SEL function to interlock ON/OFF between the manual controls area 111 of the operating region unit 110 and the manual controls area 11a of the operating region 10L of the mixer 100. Accordingly, the SEL function of the operating regions 10L, 10C, 10R within the mixer 100 can be interlocked with the SEL function of the external operating region unit 110. Also, the SEL function between the manual controls area 111 and the display area 113 may also be set to interlock ON/OFF within one operating region unit 110. Thus, even in the case where the number of the plurality of operating regions 10 are freely increased by connecting the external operating region unit 110 to the mixer 100, the SEL function can be interlocked, including the external operating region unit 110.

Figure 13:
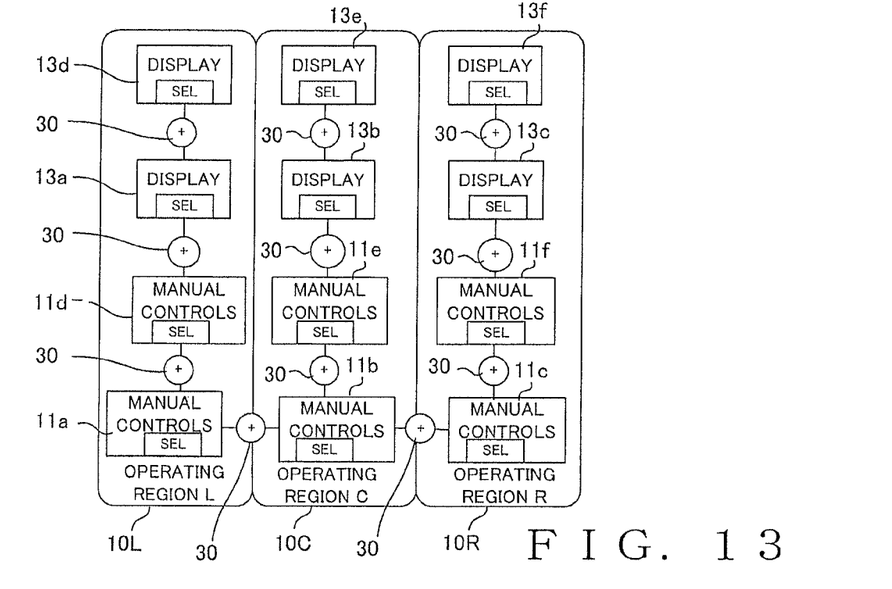
FIG. 13 is a block diagram illustrating a configuration example of still another example of the mixing console provided with a plurality of manual controls areas and a plurality of display areas in each of the operating regions.

Further, in the aforementioned embodiment, each of the operating regions 10 may include one or more manual controls area 11 and one or more display area 13. For example, in the configuration example shown in FIG. 13, the operating region 10L includes two manual controls areas 11a, 11d and two display areas 13a, 13d, the operating region 10C includes two manual controls areas 11b, 11e and two display areas 13b, 13e, and the operating region 10R includes two manual controls areas 11c, 11f and two display areas 13c, 13f. Each of the plurality of manual controls areas 11 and each of the plurality of display areas 13 have independent SEL functions 20. Two or more of such SEL functions may be interlocked in an arbitrary combination. In the example shown in FIG. 13, the interlocking controller 30 can set the SEL function to interlock ON/OFF between two adjacent areas of each of the operating regions 10L, 10C and 10R, for example, between the manual controls areas 11a and 11d in the operating region 10L, between the manual controls area 11d and the display area 13a, and between the display areas 13a and 13d. In addition, the interlocking controller 30 can set the SEL function to interlock ON/OFF between the manual controls area 11a of the operating region 10L and the manual controls area 11b of the operating region 10C, and between the manual controls area 11b of the operating region 10C and the manual controls area 11c of the operating region 10R.

While the embodiments of the present invention have been described as above, the present invention is not limited to the above-described embodiments, and various modifications are possible without departing from the scope and spirit of the invention as described in the claims, specification, and the drawings. For example, the operating region 10 may be configured to include only one of the manual controls area 11, the display area 13, and the selected channel area 60. Also, the configuration of the manual controls area 11 and the display area 13 is not limited to one including a fader manipulator according to each channel strip, a switch, an SEL switch, a display, and controls for operating the display as described above, and may be configured by including other components. In FIGS. 1, 3, 8, 11, 12B and 13, the interlocking controller 30 was described as being configured to set the SEL function 20 to interlock ON/OFF between two adjacently disposed components on the operation panel (two operating regions 10 or two manual controls areas 11). However, the interlocking control implemented by the interlocking controller 30 is not limited thereto, and any kind of control is possible as long as the SEL function 20 of two or more arbitrary components are interlocked. Further, the mixer may also be configured by software that realizes mixing processing on audio signals of a plurality of channels in a computer device such as a personal computer and a slate device. In that case, the operation panel screen displayed on the display of a computer device corresponds to the aforementioned operation panel.

This application is based on, and claims priority to, Japanese patent application No. 2014-232225 filed on 14 Nov. 2014. The disclosure of the priority application, in its entirety, including the drawings, claims, and the specification thereof, are incorporated herein by reference.

What is claimed is:

1. A mixing console for controlling signal processing on audio signals of a plurality of channels, said mixing console comprising:
    an operation panel provided with a plurality of channel strips in parallel, each of the audio signals of the plurality of channels being controlled by any one of the plurality of channel strips to which one of the plurality of channels for processing the audio signal is allocated, each of the plurality of channel strips having a user-operable control for controlling the audio signal of the channel allocated to the channel strip;
    a plurality of operating regions provided by dividing the operation panel of the mixing console into a plurality of regions, two or more channel strips of the plurality of channel strips belonging to each of the plurality of operating regions according to the division of the operation panel, two or more channels of the plurality of channels being allocated to each of the plurality of operating regions in corresponding relation to the allocation of the channels to the two or more channel strips belonging to the operating region; and
    a plurality of region channel selectors provided in corresponding relation to the plurality of operating regions, each of the plurality of region channel selectors being configured to select any one of the two or more channels allocated to the operating region corresponding to the region channel selector, wherein, in a first operational case, two region channel selectors are configured to, independently of each other, select two different channels in respectively two different operating regions so that the two different channels are simultaneously selected on the mixing console; and
    a plurality of channel parameter adjustment sections provided in corresponding relation to the plurality of operating regions, each of the plurality of channel parameter adjustment sections being configured to adjust, in response to a user's operation, a plurality of parameters for signal processing on an audio signal of the one channel selected by the region channel selector corresponding to the operating region to which the channel parameter adjustment section corresponds, wherein, in the first operational case, two channel parameter adjustment sections, corresponding to the two region channel selectors, are configured to, independently of each other, set parameters for the two different selected channels.

2. The mixing console as claimed in claim 1, further comprising an interlocking controller configured to interlock the region channel selectors between two or more different operating regions of the plurality of operating regions so that, in a second operational case, the interlocked region channel selectors of the two or more different operating regions are configured to select the same channel.

3. The mixing console as claimed in claim 1, wherein the region channel selector corresponding to each of the plurality of operating regions comprises a first channel selector provided in corresponding relation to the two or more channel strips belonging to the corresponding operating region and a second channel selector provided in corresponding relation to the channel parameter adjustment section of the corresponding operating region.

4. The mixing console as claimed in claim 3, further comprising an interlocking controller configured to interlock the first channel selector corresponding to the two or more channel strips of one of the operating regions and the second channel selector corresponding to the channel parameter adjustment section of the one or another of the operating regions so that, in a second operational case, the interlocked first and second channel selectors are configured to select the same channel.

* * * * *